United States Patent [19]

Houben et al.

[11] Patent Number: 4,595,851

[45] Date of Patent: Jun. 17, 1986

[54] COMMUTATOR MOTOR AND IMPROVED BRUSH CONSTRUCTION FOR USE IN PORTABLE MACHINE TOOLS

[75] Inventors: Jan P. Houben, Lv Breda; Antonie J. Moolenaar, An Dorst, both of Netherlands

[73] Assignee: Skil Nederland B.V., Breda, Netherlands

[21] Appl. No.: 664,975

[22] Filed: Oct. 26, 1984

Related U.S. Application Data

[62] Division of Ser. No. 467,665, Feb. 18, 1983, Pat. No. 4,539,500.

[30] Foreign Application Priority Data

Feb. 18, 1982 [NL] Netherlands ................ 8200652

[51] Int. Cl.⁴ .................... H02K 13/10; H01R 39/38
[52] U.S. Cl. .................................. 310/246; 310/244
[58] Field of Search ............. 310/230, 242, 244, 248, 310/240, 246

[56] References Cited

U.S. PATENT DOCUMENTS

| | | | |
|---|---|---|---|
| 594,745 | 11/1897 | Kennedy | 310/230 |
| 777,709 | 12/1904 | Woehr | 310/246 |
| 942,264 | 12/1909 | Kimble | 310/244 |
| 2,802,960 | 8/1957 | Baker | 310/246 |
| 2,862,124 | 11/1958 | Huber | 310/246 |

FOREIGN PATENT DOCUMENTS

| | | | |
|---|---|---|---|
| 28382 | of 1898 | United Kingdom | 310/244 |
| 15944 | of 1903 | United Kingdom | 310/244 |

Primary Examiner—Patrick R. Salce
Assistant Examiner—D. L. Rebsch
Attorney, Agent, or Firm—Birch, Stewart, Kolasch & Birch

[57] ABSTRACT

A commutator motor specifically designed for incorporation into portable machine tools such as a hand drill includes a stator winding arranged in a machine housing, and a rotor winding including a rotor shaft with a commutator ring journalled in the housing. Electrical connection between the commutator and current supply is ensured by multiple pairs of diametrically opposed carbon brushes of opposite polarity, the brushes being supported in the machine housing such that each respective pair of brushes can be separately brought into contact with the commutator by a lever capable of engaging the respective pairs of brushes. Various holder configurations support the brushes.

9 Claims, 11 Drawing Figures

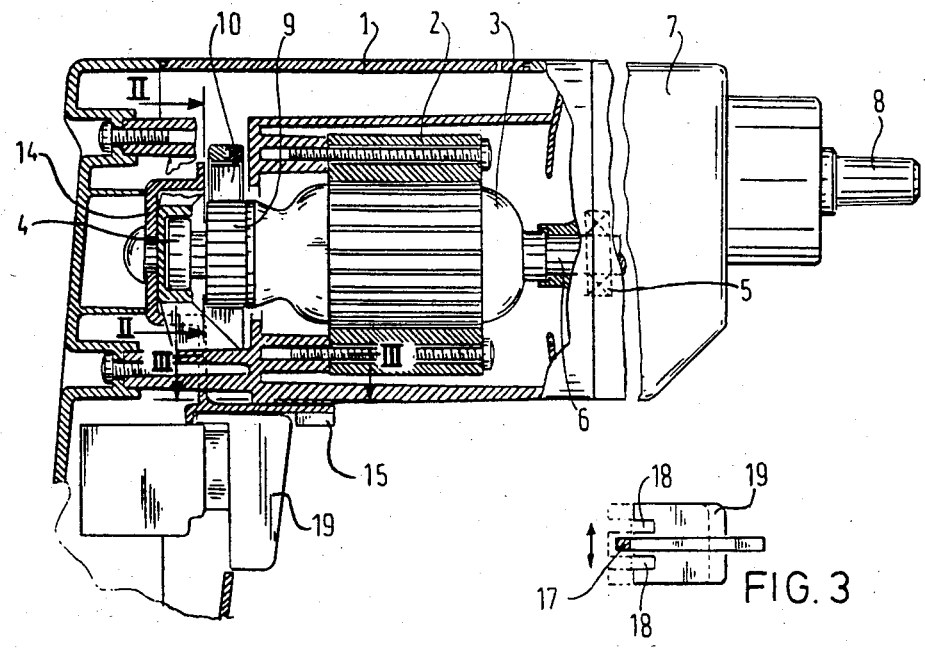
FIG. 1
FIG. 3
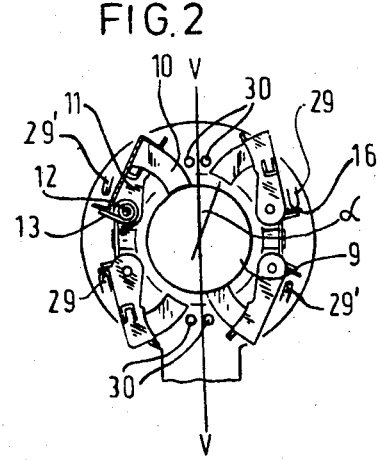
FIG. 2
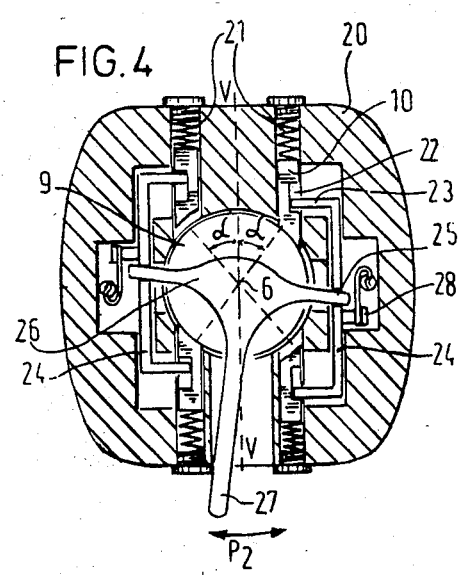
FIG. 4

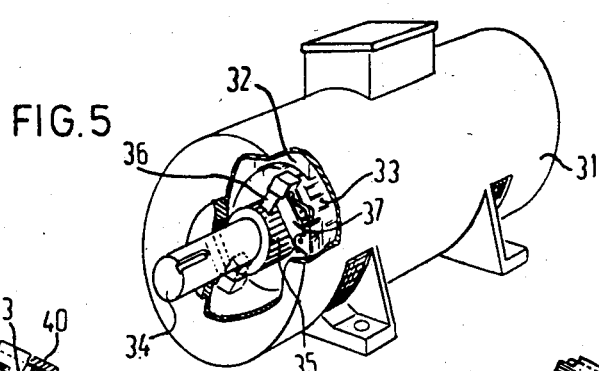
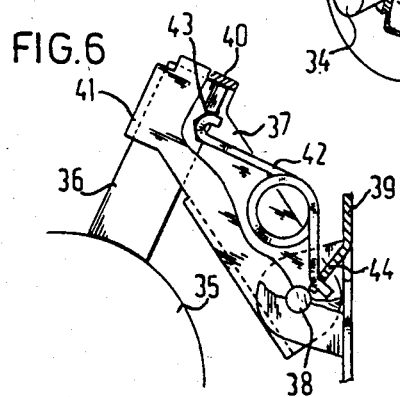
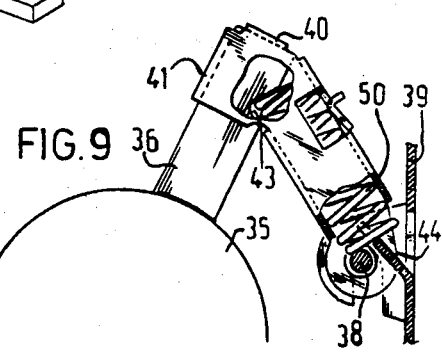
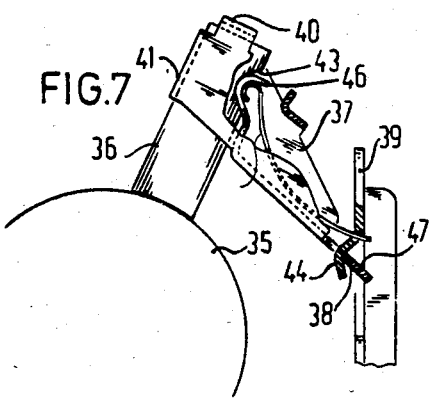
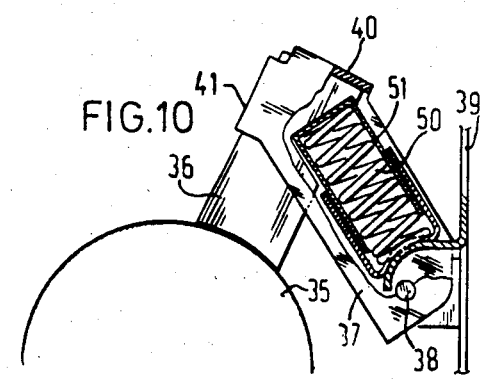
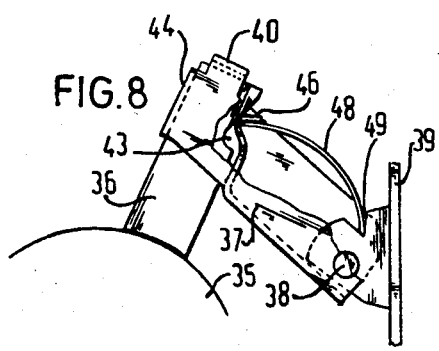
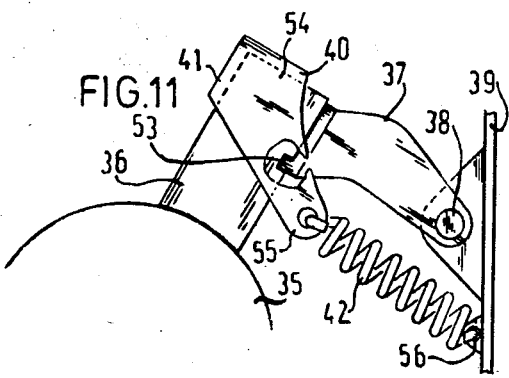

COMMUTATOR MOTOR AND IMPROVED BRUSH CONSTRUCTION FOR USE IN PORTABLE MACHINE TOOLS

This application is a divisional of copending application Ser. No. 467,665, filed on Feb. 18, 1983, now U.S. Pat. No. 4,539,500.

BACKGROUND OF THE INVENTION

The invention relates to a commutator motor such as a series motor or a permanent magnet motor to be incorporated in portable machine tools, preferably hand machine tools such as drills, the motor comprising a stator with a winding or a permanent magnet arranged in the machine housing and a rotor with a commutator journalled therein, the electric connection between the commutator and current supply being ensured by a pair of diametrically opposing brushes having different polarities.

The invention has for its object to improve the electric motor defined in the preamble in a sense such that its properties can be adapted to the job to be carried out by means of the machine. For example, the sense of rotation of the electric motor can be electrically inverted without the need for a mechanical inverting device, such as a gear box.

The motor embodying the invention is distinguished in that the brushes are supported in the machine housing so as to be displaceable with respect to the commutator axis for varying the field angle between the stator and rotor. In this way the optimum field angle can be set so that the motor can match the desired operation. In conventional machine tools the optimum field angle depends on various factors such as geometry of the stator, nominal speed or rotation, rotating mass and materials employed, while at the optimum field angle determined by these factors an anti-interference circuitry ensures that during rotation of the motor and electro-magnetic interferences are held within acceptable or required limits, while the wear of the brushes remains slight. In a further development the invention proposes two additional pairs of carbon brushes of different polarities, which pairs can be separately brought into contact with the commutator by a setting means. In this way fixed field angles can be set, as a result of which not only brush wear is appreciably reduced, but also the desired anti-interference circuitry can be provided in a simple manner.

When using such a brush system serving to invert the sense of rotation of the motor only two pairs of carbon brushes need be employed, which have the same field angle with respect to a neutral line so that one and the same anti-interference circuit is sufficient.

In a simple embodiment it is preferred to arrange the brushes of the pairs intended for the same polarity on a common carrier with a common current conductor.

The setting means may be formed by an element being rotatable concentrically with the commutator axis and having a handle actuable externally of the machine housing, the element being provided with cams for lifting the brushes but one having the same polarity, while the brushes can be pressed by spring tension against the commutator ring.

As an alternative the setting means may be designed so that they bring only one pair of brushes of different polarities into contact with the commutator ring.

Further, the invention relates to a portable machine tool having a machine housing, a handle provided with a switch for energizing an electric motor described above and arranged in the housing, the machine tool being distinguished in that the setting means are provided with a blocking member for blocking the switch in a position of the setting means in which the brushes of different polarities other than those located diametrically opposite one another are in contact with the commutator.

Thanks to this blocking member a potential unintentional switching or a shortcircuit is avoided.

Further the invention relates to an electric motor mainly comprising a stator and rotor arranged in a housing provided with a commutation ring and brushes co-operating therewith, each of which is arranged in a holder which is pivotable with respect to the housing.

The invention has for its object to improve the suspension or fastening of the brushes in the electric motor in a manner such that the introduction of the brushes into the holder is facilitated, the electric contact between brush and holder is improved, the shape of the brush itself remains simple and/or the pressing force of the brush on the commutator ring can remain substantially constant even after some amount of wear and, respectively, can exhibit an increasing or decreasing pressure characteristic curve.

SUMMARY OF THE INVENTION

According to the invention these purposes are achieved by providing an electric motor which is distinguished in that the holder is provided with at least one abutment located at a distance from the pivotal axis and an elastic element is arranged between the brush engaging the abutment and a support connected with the housing at the side of the pivotal axis.

The holder is compelled by the elastic element towards the commutator so that the desired contact between breush and commutator is established. By turning the holder about the pivotal axis the elastic element will exert a different force on the holder owing to the variation in length so that by the correct choice of the elastic element the desired pressure characteristic can be obtained in a simple manner. Since the elastic element urges the brush directly against the stop of the holder, it will not only guard the brush in the holder but also establish a satisfactory electric contact between brush and holder. Since the brush is fastened in the holder only by the elastic element, the brush may have a very simple shape without the need for using additional conductors.

In order to improve the guarded position of the elastic element at the brush, the invention furthermore proposes to insert the elastic element into a recess of the brush.

When the current is fed via the holder, which may, in known manner, be made of conductive material, the current can be prevented from passing through the elastic element by arranging a separation member between the brush and the elastic element so that variation of the elastic properties of the element due to development of heat can be avoided.

According to one aspect the present invention the separation member can be formed by a resilient tag of the holder.

The elastic element is preferably designed in the form of a leaf spring or a helical spring.

BRIEF DESCRIPTION OF DRAWINGS

The above-mentioned and further features of the invention will be described more fully with reference to the drawing showing a number of embodiments.

The drawings show in:

FIG. 1 a side elevation and partly cross-sectional view of a hand machine tool,

FIG. 2 a sectional view taken on the line II—II in FIG. 1,

FIG. 3 a sectional view taken on the line III—III in FIG. 1,

FIG. 4 a sectional view corresponding to FIG. 2 of an alternative design of the brush structure, FIG. 5 a perspective view of an electric motor, part of the housing of which is broken away to expose the improved brush construction, FIGS. 6 to 11 each an axial elevational view of different embodiments of a holder comprising a brush.

DETAILED DESCRIPTION

The hand machine tool shown in FIG. 1 mainly comprises a machine housing 1, in which a stator winding 2 is arranged and a rotor 3 journalled therein by means of the bearings 4, and 5. The output rotor shaft 6, shown on the righthand side in FIG. 1 is connected through a gear box 7 not shown in detail with a tool shaft 8.

A commutator 9 is arranged concentrically with the rotor shaft 6, while two or more brushes 10, for example carbon brushes, are arranged around the said commutator. The brushes are arranged so that the contact faces are located diametrically opposite each other with respect to the rotor shaft 6. The line going through the contact faces is at an angle $\alpha$ to the vertical line in FIG. 2, the angle having a direct relationship to the angle between the vertical line V—V and the vector produced by electro-magnetic fields generated in the stator winding 2 and the rotor winding 3 respectively.

According to the invention this angle can be varied by changing the contact faces along the periphery of the commutator ring 9 with respect to the vertical V—V.

In a first embodiment shown in FIG. 2 four brushes 10 are arranged around the commutator ring 9. each brush 10 being fixed in a holder 11, which is rotatable about a pin 12 and biassed by means of a spring structure 13 in the direction towards the commutator ring, the spring 13 thus ensuring the contact between the brush 10 and the periphery of the commutator ring 9.

A stop 30 on the motor housing limits the maximum stroke of the holder after wear of the brush.

On the side of the commutator ring 9 remote from the rotor is arranged a setting means formed by a plate 14 rotatable concentrically with the rotor shaft 6, the plate being prolonged on the underside to form a handle 15 actuable externally of the machine housing 1. By means of this handle 15 the setting element 14 can be set in two working positions so that corresponding brushes can be lifted from the commutator ring 9 by means of cams 29, and 29' associated with each brush 10. Each cam cooperates with an extension 16 on the holder 11 so that, for example, by turning the cams 29 in clockwise direction the right-hand upper brush and the lefthand lower brush are lifted from the commutator 9. The two other brushes released by cams 29' are urged against the commutator ring 9 by means of the spring 13. With this setting the motor will rotate in a given direction. When the element 14 is displaced in the reverse sense, the associated cams 29' will lift the left-hand upper brush and the right-hand lower brush from the commutator ring 9, whereas the other two brushes are released and urged by means of the spring 13 against the commutator ring 9. With this setting the motor will rotate in the other direction. Owing to the symmetrical disposition of the brushes the same angle $\alpha$ is maintained so that the same anti-interference circuit in the machine tool is sufficient, the angle $\alpha$ thus being the optimum angle for the machine.

The cams 29 and 29' may be adjustably or readjustably arranged on the plate 14 so that in the position of the plate 14 intermediate of the working positions, all brushes are lifted from the commutator ring. Thus, shortcircuiting is prevented. In order to limit brush wear to a given value the stop 30 might be replaced by a matching maximum distance between the cams 29 and 29' and a maximum permissible angular turn of the plate 14.

As an alternative, the cams 29, 29' may have relatively fixed positions on the plate 14. In order to allow wear of the brushes 10 they have a large initial length. Owing to the wear of the brush 10 the angle of the holder 11 in the contact state of the brush 10 will change and hence the extension 16 will be in a different position. Therefore, the cams 29, and 29' have to occupy such a position on the element 14 that sufficient play is left. This may result in that in the intermediate positions of the element 14 the four brushes are in contact with the commutator ring 9. In order to avoid switching on of the main voltage under these conditions, the handle 15 is provided with a cam 17, which cooperates with recesses 18 in the left-hand side of a switching handle 19 (FIG. 3). Depressing the handle 19 ensures in a known manner that the electric motor is energized. However, when the handle 15 is in the neutral position, the cam 17 is not located opposite the recess 18 in the hand switch 19 so that depression thereof is not possible. As soon as the handle 15 is laterally displaced, the cam 17 is positioned opposite one of the recesses 18 so that the motor can be energized.

FIG. 4 shows an alternative disposition of the brushes in a sense such that also in this case the line of connection between the pairs of associated brushes are at the same angle $\alpha$ with respect to the neutral line V—V. The control of the brushes, however, is different in a sense such that each brush 10 is displaceable in a holder 20. The brushes are urged by springs 21 towards to commutator 9. Each brush has a recess 22 into which extends a nose 23 of a control element 24. At 25 each element 24 is rotatably connected with the handle 15. A turn of the lever 27 in the direction of the arrow p2 about the rotor shaft 6 results in a displacement of the elements 24 in the opposite sense such that, in the embodiment shown in FIG. 4 the left-hand upper brush and the right-hand lower brush are lifted from the commutator ring 9, whereas the other two brushes are released and brought into contact by the springs 21 with the commutator ring. A turn of the lever 27 in the other sense provides a different position of the brushes 10 and hence a different sense of rotation of the motor.

In the two embodiments, the brushes having the same polarity, that is to say the brushes on the right-hand side or on the left-hand side of the plane V—V, are connected with a common current conductor 28.

The invention is not limited to the embodiments depicted above. For example, one pair of diametrically opposite brushes may be displaceably arranged at an angle 2 to the plane V—V and the polarity of the brushes may be inverted so that the sense of rotation of the motor is also inverted.

Furthermore, the scope of the invention also covers more than two pairs of carbon brushes so that other field angles α can be introduced.

The brushes may be displaced in any way around the commutator ring, for example, they may be in a more or less radial position, as shown in FIG. 4, or they may be disposed axially with respect to the rotor shaft.

The electric motor schematically shown in FIG. 5 mainly comprises a housing 31 accomodating a stator 32 and a rotor 33. The rotor shaft 34 is provided with a commutator ring 35, which is in a known manner connected to the rotor winding 33. With the commutator ring 35 are co-operating two diametrically opposite brushes 36, which are pivotally arranged in a holder 37 with respect to the housing 31.

With reference to FIGS. 6 to 10 the particular brush construction embodying the invention will be described more fully.

As shown in FIG. 6 the holder 37 is pivotable about a pin 38 with respect to a support 39 connected with the housing. The holder is provided with a stop formed by two stop faces 40 and 41 being at an angle to one another, the angle corresponding with the adjacent angle of the brush 36. Between the brush 36 and the support 39 is arranged an elastic element formed by a wire spring 42. One end of the wire spring 42 is bent over and fits in a recess 43 of the brush. The other end bears on a tag 44 of the support on the side of the pivotal axis 38 remote from the commutator ring 35. The elastic element 42 produces a pressing force on the brush 36 in the direction towards the stop faces 40 and 41 so that in all positions of the holder 37 relative to the support 39 an intimate contact with the faces is established. Moreover, the pressing force exerted by the elastic element 42 produces a torque in a counter-clockwise direction about the axis 38 on the holder 37 so that the brush 36 is pressed against the commutator ring 35.

The pressing force of the brush 36 on the commutator ring 35 varies with the torque exerted by the spring 42. This torque is determined by the pressure vector of the spring 42 and the distance of the vector from the turning point 38. By turning the holder 37 the pressure of the spring 42 as well as the angular position of the force vector and hence the arm of the torque are varied so that by correct location and proportioning of the spring 42, the recess 43 and the tag 44 respectively, the desired pressure characteristic of the brush 36 on the commutator ring 35 is obtained. In this simple manner an increasing or, respectively decreasing pressure characteristic between brush 36 and commutator ring 35 can be obtained, which may particularly be important in avoiding a vibration phenomena due to the natural frequency.

In the further figures corresponding parts are designated by the same reference numerals.

FIG. 7 shows an elastic element in the form of a leaf spring 45 fitting between the sidewalls of the holder 37, one bent-over end of the spring lying in a resilient tag 46 of the support 37, the resilient tag fitting in the recess 43 of the brush 36.

The other end of the leaf spring 45 bears on the foot of the tag 44 of the support, the tag 44 pivotally cooperating with a tongue-shaped end 47 of the holder 37 to form the pivotal axis 38. In this embodiment such spring 45 is screened from the brush 36 in a sense such that the current is conducted as much as possible through the holder 37. The resilient tag 46 will transfer any passing current in the spring 45 directly to the holder 37 and thus reduce the passage of current via the spring 45.

Referring to FIG. 8 a leaf spring 48 corresponding with the leaf spring 45 is used. The other end thereof is bearing in a notch 49 of the support 39. One end is again arranged in a resilient tag 46 of the support 37, the resilient tag fitting in the recess 43 of the brush 36.

FIG. 9 shows an embodiment in which the elastic element is formed by a helical spring 50, one end of which is directly bearing in the recess 43 of the brush 36, whereas the other end bears on a tag 44 of the holder 39.

FIG. 10 shows an elastic element corresponding to FIG. 9 in the form of a helical spring 50, which is screened in this embodiment from the brush 36, by a telescopic housing 51. This housing or separation member may be made of electrically insulating material.

FIG. 11 shows a holder 37, which is rotatably supported at 38. The holder is provided with an L-shaped stop, the short limb of which is lying in a recess 53 of the brush 36. The brush is held in a loose bracket 54, to the end 55 of which is connected an elastic element 42 formed by a tensile spring. The other end of the spring 42 is connected at 56 with the support 39 on the side of the turning point 38 facing the commutator 35. The tensile spring spring 42, like the compression spring of the preceding commutator 35, tends to turn the holder 37 in counter-clockwise direction about the turning point 38.

The invention is not limited to the embodiments depicted above. For example, the brush 36 may have any desired cross-section, while different kinds of stop faces 40 and 41 may be used for suitable current condition. The holder may be made of electrically non-conductive material, in which case the elastic element passes the current.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electric motor comprising
   a housing,
   a stator winding located in said housing,
   a rotor shaft carrying a rotor journaled in said housing,
   a commutator ring carried by said rotor shaft,
   brushes arranged in diametrically opposed brush pairs, said brushes positioned in said housing and cooperating with said commutator ring,
   each said brush having a recess and being arranged in a holder,
   each said holder being pivotable with respect to said housing at a first end,
   each said holder being provided with at least one stop at a second end opposite said pivotable end,
   spring means for keeping each said brush in engagement with said stop and for biasing said holder toward said commutator ring, and
   one end of said spring means being located in said brush recess.

2. An electric motor as set forth in claim 1, wherein said stop has the form of two stop faces being at an angle to one another.

3. An electric motor as set forth in claim 1 wherein said spring means includes an elastic element one end of which fits into a recess of the respective brush.

4. An electric motor as set forth in claim 1, wherein a separation member is arranged between said spring means and said brush.

5. An electric motor as set forth in claim 1, wherein said spring means is a leaf spring.

6. An electric motor as set forth in claim 1 wherein said spring means is a wire spring.

7. An electric motor as set forth in claim 6, wherein said spring means biases each said holder about its pivotable end.

8. An electric motor as set forth in claim 6, wherein one end of said spring means engages a support connected with said housing.

9. An electric motor as set forth in claim 1, wherein said pivotable end moves about a pivot positioned on said support.

* * * * *